United States Patent
Evans et al.

(10) Patent No.: US 7,228,723 B2
(45) Date of Patent: Jun. 12, 2007

(54) BUMPER IMPACT-TESTING DEVICE

(75) Inventors: Darin Evans, Wixom, MI (US); Wayne C. Graves, Royal Oak, MI (US)

(73) Assignee: NetShape Energy Management LLC, Novi, MI (US)

( * ) Notice: Subject to any disclaimer, the term of this patent is extended or adjusted under 35 U.S.C. 154(b) by 48 days.

(21) Appl. No.: 11/051,904

(22) Filed: Feb. 4, 2005

(65) Prior Publication Data

US 2006/0001278 A1    Jan. 5, 2006

Related U.S. Application Data

(60) Provisional application No. 60/584,510, filed on Jul. 1, 2004.

(51) Int. Cl.
  G01M 7/00    (2006.01)
  G01N 3/00    (2006.01)
  G01N 33/00   (2006.01)
  G01P 15/00   (2006.01)

(52) U.S. Cl. ..................................... 73/12.09
(58) Field of Classification Search ............... 73/12.09
  See application file for complete search history.

(56) References Cited

U.S. PATENT DOCUMENTS

| | | | |
|---|---|---|---|
| 2,349,907 A | 5/1944 | Kos et al. | |
| 2,903,289 A | 9/1959 | Kiix | |
| 3,011,602 A | 12/1961 | Ensrud et al. | |
| 3,231,454 A | 1/1966 | Williams | |
| 3,506,295 A | 4/1970 | Yancey | |
| 3,577,305 A | 5/1971 | Hines et al. | |
| 3,638,985 A | 2/1972 | Barton et al. | |
| 3,638,992 A | 2/1972 | Forshee | |
| 3,695,665 A | 10/1972 | Matsuura | |
| 3,727,870 A | 4/1973 | Bass | |
| 3,746,605 A | 7/1973 | Dillon et al. | |
| 3,747,968 A | 7/1973 | Hornsby | |
| 3,768,850 A | 10/1973 | Barton et al. | |
| 3,778,093 A | 12/1973 | Renner | |
| 3,782,767 A | 1/1974 | Moore | |

(Continued)

FOREIGN PATENT DOCUMENTS

DE    4239460    5/1994

(Continued)

OTHER PUBLICATIONS

"Important Considerations in the Development of a Test to Promote Stable Bumper Engagement in Low-Speed Crashes" by Avery et al. SAE Technical Paper Series 2004-01-1319, Mar. 2004.*

*Primary Examiner*—Michael Cygan
*Assistant Examiner*—O. Davis
(74) *Attorney, Agent, or Firm*—Price, Heneveld, Cooper, DeWitt & Litton LLP

(57) ABSTRACT

Standardized bumper testing includes a barrier adapted for testing vehicle bumper impact strength and engagement. The present improvement includes first and/or second thermoformed components attached to the barrier to replicate a profile and crush characteristics of a "generic" vehicle bumper. The first face component is an energy absorbing component with crush boxes for impact absorption, and replicates an energy absorber. The second component covers the first component and replicates a fascia.

6 Claims, 3 Drawing Sheets

U.S. PATENT DOCUMENTS

| | | |
|---|---|---|
| 3,782,768 A | 1/1974 | Moore |
| 3,810,668 A | 5/1974 | Kornhauser |
| 3,837,991 A | 9/1974 | Evans |
| 3,871,636 A | 3/1975 | Boyle |
| 3,877,741 A | 4/1975 | Wilfert et al. |
| 3,885,074 A | 5/1975 | Chandler |
| 3,900,222 A | 8/1975 | Muller |
| 3,900,356 A | 8/1975 | Koch et al. |
| 3,902,748 A | 9/1975 | Bank et al. |
| 3,930,665 A | 1/1976 | Ikawa |
| 3,933,387 A | 1/1976 | Salloum et al. |
| 3,938,841 A | 2/1976 | Glance et al. |
| 3,971,583 A | 7/1976 | Kornhauser |
| 3,995,901 A | 12/1976 | Filbert, Jr. et al. |
| 3,997,207 A | 12/1976 | Norlin |
| 4,022,505 A | 5/1977 | Saczawa, Jr. |
| 4,029,350 A | 6/1977 | Goupy et al. |
| 4,050,689 A | 9/1977 | Barton et al. |
| 4,061,384 A | 12/1977 | Montgomery et al. |
| 4,061,385 A | 12/1977 | Schwartzberg |
| 4,070,052 A | 1/1978 | Ng |
| 4,072,334 A | 2/1978 | Seegmiller et al. |
| 4,076,872 A | 2/1978 | Lewicki et al. |
| 4,096,306 A | 6/1978 | Larson |
| 4,105,236 A | 8/1978 | Haar |
| 4,106,804 A | 8/1978 | Scrivo |
| 4,116,893 A | 9/1978 | Flanagan |
| 4,154,469 A | 5/1979 | Goupy et al. |
| 4,190,276 A | 2/1980 | Hirano et al. |
| 4,221,413 A | 9/1980 | Bonnetain |
| 4,287,250 A | 9/1981 | Rudy |
| 4,314,865 A | 2/1982 | Ottaviano |
| 4,321,989 A | 3/1982 | Meinzer |
| 4,344,536 A | 8/1982 | Oberhuber |
| 4,352,484 A | 10/1982 | Gertz et al. |
| 4,354,700 A | 10/1982 | Goupy et al. |
| 4,411,121 A | 10/1983 | Blacklin et al. |
| 4,413,856 A | 11/1983 | McMahan et al. |
| 4,427,474 A | 1/1984 | Ottaviano |
| 4,533,583 A | 8/1985 | May |
| 4,542,925 A | 9/1985 | Huber et al. |
| 4,551,379 A | 11/1985 | Kerr |
| 4,578,296 A | 3/1986 | Miyazaki et al. |
| 4,597,601 A | 7/1986 | Manning |
| 4,631,221 A | 12/1986 | Disselbeck et al. |
| 4,635,981 A | 1/1987 | Friton |
| 4,666,130 A | 5/1987 | Denman et al. |
| 4,720,261 A | 1/1988 | Fishwick et al. |
| 4,844,213 A | 7/1989 | Travis |
| 4,889,758 A | 12/1989 | Rinkewich |
| 4,890,877 A | 1/1990 | Ashtiani-Zarandi et al. |
| 4,909,661 A | 3/1990 | Ivey |
| 4,951,986 A | 8/1990 | Hanafusa et al. |
| 4,995,659 A | 2/1991 | Park |
| 5,030,501 A | 7/1991 | Colvin et al. |
| 5,033,593 A | 7/1991 | Kazuhito |
| 5,042,859 A | 8/1991 | Zhang et al. |
| 5,098,124 A | 3/1992 | Breed et al. |
| 5,106,137 A | 4/1992 | Curtis |
| 5,141,279 A | 8/1992 | Weller |
| 5,152,023 A | 10/1992 | Graebe |
| 5,165,990 A | 11/1992 | Nakano |
| 5,192,157 A | 3/1993 | Laturner |
| 5,243,722 A | 9/1993 | Gusakov |
| 5,293,973 A | 3/1994 | Thum |
| 5,306,066 A | 4/1994 | Saathoff |
| 5,356,177 A | 10/1994 | Weller |
| 5,364,682 A | 11/1994 | Tanaka et al. |
| 5,399,406 A | 3/1995 | Matsuo et al. |
| 5,425,561 A | 6/1995 | Morgan |
| 5,431,463 A | 7/1995 | Chou |
| 5,435,619 A | 7/1995 | Nakae et al. |
| 5,500,037 A | 3/1996 | Alhamad |
| 5,518,802 A | 5/1996 | Colvin et al. |
| 5,549,327 A | 8/1996 | Rüsche et al. |
| 5,564,535 A | 10/1996 | Kanianthra |
| 5,573,272 A | 11/1996 | Teshima |
| 5,596,781 A | 1/1997 | Graebe |
| 5,636,866 A | 6/1997 | Suzuki et al. |
| 5,651,569 A | 7/1997 | Molnar |
| 5,660,426 A | 8/1997 | Sugimori et al. |
| 5,700,545 A | 12/1997 | Audi et al. |
| 5,725,266 A | 3/1998 | Anderson et al. |
| 5,727,826 A | 3/1998 | Frank et al. |
| 5,731,062 A | 3/1998 | Kim et al. |
| 5,746,419 A | 5/1998 | McFadden et al. |
| 5,762,392 A | 6/1998 | Suga |
| 5,769,003 A | 6/1998 | Rose et al. |
| 5,780,129 A | 7/1998 | Ohta |
| 5,799,991 A | 9/1998 | Glance |
| 5,806,889 A | 9/1998 | Suzuki et al. |
| 5,836,641 A | 11/1998 | Sugamoto et al. |
| 5,851,626 A | 12/1998 | McCorry et al. |
| 5,896,680 A | 4/1999 | Kim et al. |
| 5,950,835 A | 9/1999 | Moser et al. |
| 5,972,477 A | 10/1999 | Kim et al. |
| 6,007,898 A | 12/1999 | Kim et al. |
| 6,012,764 A | 1/2000 | Seksaria et al. |
| 6,017,084 A | 1/2000 | Carroll, III et al. |
| 6,082,792 A | 7/2000 | Evans et al. |
| 6,085,878 A | 7/2000 | Araki et al. |
| 6,186,582 B1 | 2/2001 | Beckmann |
| 6,199,942 B1 | 3/2001 | Carroll, III et al. |
| 6,234,526 B1 | 5/2001 | Song et al. |
| 6,247,745 B1 | 6/2001 | Carroll, III et al. |
| 6,315,339 B1 | 11/2001 | Devilliers et al. |
| 6,319,438 B1 | 11/2001 | Smith et al. |
| 6,367,361 B1 | 4/2002 | Christensen et al. |
| 6,375,251 B1 | 4/2002 | Taghaddos |
| 6,406,079 B2 | 6/2002 | Tamada et al. |
| 6,406,081 B1 | 6/2002 | Mahfet et al. |
| 6,435,579 B1 | 8/2002 | Glance |
| 6,443,513 B1 | 9/2002 | Glance |
| 6,609,740 B2 | 8/2003 | Evans |
| 8,644,701 | 11/2003 | Weissenborn et al. |
| 6,663,150 B1 * | 12/2003 | Evans ........................ 293/120 |
| 6,669,251 B2 * | 12/2003 | Trappe ...................... 293/120 |
| 6,679,967 B1 | 1/2004 | Carroll, III et al. |
| 6,681,907 B2 | 1/2004 | Le |
| 6,682,128 B2 | 1/2004 | Carroll, III et al. |
| 6,726,262 B2 * | 4/2004 | Marijnissen et al. ........ 292/121 |
| 6,752,450 B2 | 6/2004 | Carroll, III et al. |
| 6,848,730 B2 * | 2/2005 | Evans ........................ 293/121 |
| 6,866,313 B2 * | 3/2005 | Mooijman et al. .......... 293/120 |
| 6,923,494 B2 * | 8/2005 | Shuler et al. .......... 296/187.05 |
| 6,926,323 B2 * | 8/2005 | Evans ........................ 293/120 |
| 6,938,936 B2 * | 9/2005 | Mooijman et al. .......... 293/120 |
| 6,994,384 B2 * | 2/2006 | Shuler et al. ................ 293/120 |
| 7,052,056 B2 * | 5/2006 | Weissenborn et al. ...... 293/120 |
| 2001/0035658 A1 | 11/2001 | Anderson et al. |
| 2002/0005644 A1 | 1/2002 | Tamada et al. |
| 2002/0017805 A1 | 2/2002 | Carroll, III et al. |
| 2002/0056943 A1 | 5/2002 | Bibeau |
| 2002/0060462 A1 * | 5/2002 | Glance ...................... 293/120 |
| 2002/0149213 A1 | 10/2002 | Weissenborn |
| 2002/0149214 A1 * | 10/2002 | Evans ........................ 293/120 |
| 2002/0158371 A1 | 10/2002 | Winget et al. |
| 2003/0047952 A1 | 3/2003 | Trappe |
| 2003/0189343 A1 * | 10/2003 | Evans et al. ................ 293/120 |
| 2003/0218341 A1 | 11/2003 | Jonsson et al. ............. 293/102 |
| 2004/0169381 A1 * | 9/2004 | Evans et al. ................ 293/121 |
| 2004/0256867 A1 * | 12/2004 | Evans et al. ................ 293/102 |
| 2005/0057053 A1 * | 3/2005 | Evans et al. ................ 293/133 |

| | | | | | | |
|---|---|---|---|---|---|---|
| 2005/0285418 A1* | 12/2005 | Evans | 293/155 | JP | 360169353 | 9/1985 |
| | | | | JP | 2179721 | 7/1990 |
| FOREIGN PATENT DOCUMENTS | | | | JP | 402179721 | 7/1990 |
| | | | | JP | 403266743 | 11/1991 |
| DE | 19522575 | 1/1996 | | WO | 9606288 | 2/1996 |
| DE | 19537186 | 4/1996 | | | | |
| EP | 0073478 | 3/1983 | | * cited by examiner | | |
| FR | 2747445 | 10/1997 | | | | |

BUMPER IMPACT-TESTING DEVICE

This application claims benefit under 35 USC 119(e) of provisional application Ser. No. 60/584,510, filed Jul. 1, 2004, entitled BUMPER IMPACT-TESTING DEVICE, the entire contents of which are incorporated herein in their entirety.

BACKGROUND

The present invention relates to bumper impact-testing arrangements, where an impact barrier such as a pendulum or stationary barrier is modified to be more like a vehicle bumper on its impacting surface.

Vehicle bumper testing is an important part of Federal Motor Vehicle Safety Standards and related automobile insurance associations ratings and standards. Recently, government regulatory agencies and the insurance industry associations have wanted tests that better measure the stability of vehicle bumper engagements in low-speed crashes. (See SAE Technical paper 2004-01-1319, dated Mar. 8, 2004, entitled "Important Considerations in the Development of a Test to Promote Stable Bumper Engagement in Low-Speed Crashes".) The goal is to develop a test apparatus that is able to test vehicle-to-vehicle collisions on (existing) standardized impact barriers under conditions in a manner better replicating damage to a vehicle from "real world" front end (or rear end) collisions . . . such as where the bumper of one vehicle is allowed to slip vertically onto (or under) the bumper of another vehicle. In the SAE article noted above, various energy absorbers were attached to the faces of standardized barriers, and tests were conducted and test results were analyzed. However, further improvements are desired. (See page 10 of the SAE paper 2004-01-1319, column 2, lines 24–26, "[M]ore research and development of the contoured barrier and deformable element is needed, . . . ")

Significantly, the testing reported in the SAE article 2004-01-1319 did not provide a fascia-replicating component on the standardized barrier. Absence of a fascia-replicating component can substantially affect the dynamics of a first bumper slipping onto (or under) a second bumper, and substantially affect both collapse of the energy absorber and the amount of vehicle damage. At the same time, even though a fascia-replicating component is desired, it is desirable to allow visual access to the energy absorber without disassembly of the standardized barrier after testing. Also, attachment of the various energy absorbers to the impact barrier is not standardized and can be more difficult than is initially apparent, since attachment locations on each of the various production energy absorbers are different, as are their rear surface shapes. Both attachment and rear surface support can significantly affect performance of the energy absorber and its function. No solution to these dilemmas was suggested in the SAE article 2004-01-1319. Further, the SAE paper did not address cost issues, such as tooling costs, cost of materials, and inventory costs for bumper testing facilities. At least one entity has suggested using honeycomb aluminum (e.g. CellBond® material) adhered to a face of a barrier impact tester. However, this material is expensive, contains sharp edges when machined or cut to a given shape, and once adhered, becomes a "permanent" part of the barrier impact tester that cannot be easily removed. It is also undesirable to weld brackets and/or otherwise permanently change the impact barrier, because, aside from cost, such changes can affect or hinder other bumper tests where fascia replication is not required or desired.

The illustrated barrier 21 (FIGS. 2–4) is a prior art standardized tester. It includes a base mounting plate 26 for attachment to a pendulum support or stationary anchor, a pair of support walls 27, and a vertically-flat horizontally-curved front face plate 28 generally representing an aerodynamic vehicle bumper. The procedures for using the barriers are well known and are spelled out in American Standard Testing Methods (ASTM) manuals. It is desirable to improve the barrier 21, and other similar barriers, by providing an arrangement that better replicates a front (or rear) bumper of a vehicle, so that standardized testing can be conducted on vehicles for the purpose of determining damage from the "slipping" of one vehicle bumper over or under another vehicle bumper during a low-speed two-vehicle bumper-to-bumper collision. At the same time, any such solution must address the practical need to be inexpensive to accommodate a large number of tests (e.g. over 8,000 per year) and due to the limited funds available for testing and the cost pressures on government, insurance, automotive original equipment manufacturers, and independent vehicle test facilities. Also, the system must be easy to use, and preferably should not use adhesives or means of permanent attachment.

Thus, a modified bumper impact-testing arrangement having the aforementioned advantages and solving the aforementioned problems is desired. In particular, a standardized barrier test system is desired that allows a fascia-like member to be incorporated into the barrier tester, but that does not prevent or confuse the ability to "read" and visually inspect the test results, including deformation of internal parts, and that does not result in excessive costs and inventory considerations. Also, a single low-cost energy absorber is desired that can be used on barriers having different sweep radii.

SUMMARY OF THE PRESENT INVENTION

In one aspect of the present invention, an energy absorber adapted for attachment to a face of a bumper impact tester includes an energy-absorbing component thermally formed from a sheet of polymeric material, the component having a base wall shaped to engage the face of the bumper impact tester. Front walls are shaped to replicate a profile of a vehicle bumper and thermoformed fore-aft walls support the front walls on the base wall, the fore-aft walls forming with the front walls energy-absorbing crush boxes that extend forward of the base wall. The energy-absorbing component is symmetrical and has opposing first and second ends configured so that after a corner impact on the first end, the component can be inverted and reversed on the impact tester and used for a second corner impact on the second end.

In another aspect of the present invention, an energy absorber adapted for attachment to a face of a bumper impact tester includes an energy-absorbing component thermally formed from a sheet of polymeric material, the component having a base wall shaped to engage the face of the bumper impact tester. Front walls are shaped to replicate a profile of a vehicle bumper and thermoformed fore-aft walls support the front walls on the base wall, the fore-aft walls forming with the front walls energy-absorbing crush boxes that extend forward of the base wall. The energy-absorbing crush boxes are sufficiently spaced apart and the base wall is sufficiently flat and flexible such that the energy-absorbing component can be flexed longitudinally to match different curvilinear shapes of a front surface on different bumper impact testers.

In another aspect of the present invention, an energy absorber adapted for attachment to a face of a bumper impact tester includes an energy-absorbing component thermally formed from a sheet of polymeric material, the component having a base wall shaped to engage the face of the bumper impact tester. Front walls are shaped to replicate a profile of a vehicle bumper and thermoformed fore-aft walls support the front walls on the base wall. The fore-aft walls form with the front walls energy-absorbing crush boxes that extend forward of the base wall, the base wall having attachment flanges that extend rearwardly and that are adapted to wrap onto a top and a bottom of the face of the bumper impact tester to aid in attachment and stability of the energy absorber on the bumper impact tester.

In another aspect of the present invention, an energy absorber adapted for attachment to a face of a bumper impact tester includes an energy-absorbing component thermally formed from a sheet of polymeric material, the component having a base wall shaped to engage the face of the bumper impact tester. Front walls are shaped to replicate a profile of a vehicle bumper and thermoformed fore-aft walls support the front walls on the base wall, the fore-aft walls forming with the front walls energy-absorbing crush boxes that extend forward of the base wall. A holder with a recess is configured to engage and retain the component to the bumper impact tester, the holder having attachment slots therein along top and bottom edges of the holder for engaging top and bottom surfaces on the face of the bumper impact tester.

It is an object of the present invention to provide an energy absorber for removable attachment to a barrier impact tester for vehicle bumper systems.

It is an object of the present invention to provide an energy absorber able to flex and attach to barrier impact testers for vehicle bumper systems that have different sweep radii.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
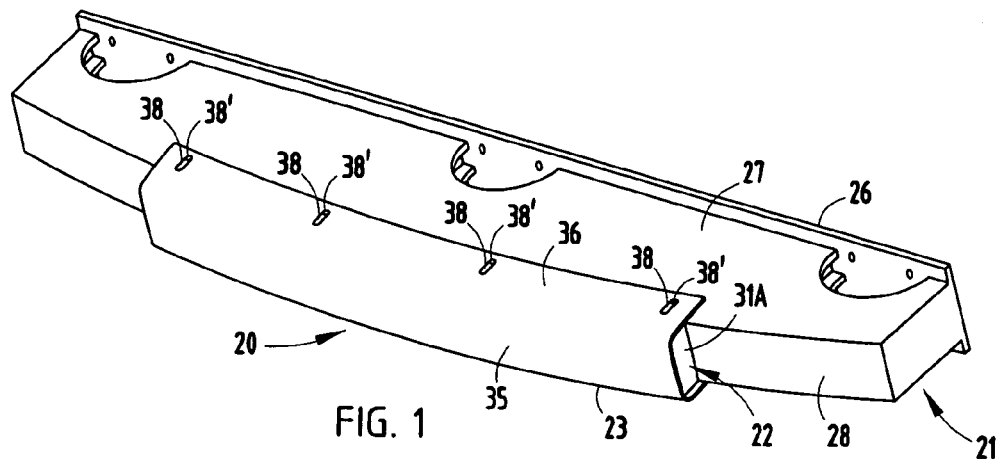
FIG. 1 is a perspective view of a bumper barrier impact tester arrangement, including a first thermoformed energy-absorber-simulating component and a second thermoformed fascia-simulating cover component attached to and engaging a face of a standardized barrier.
Figure 2:
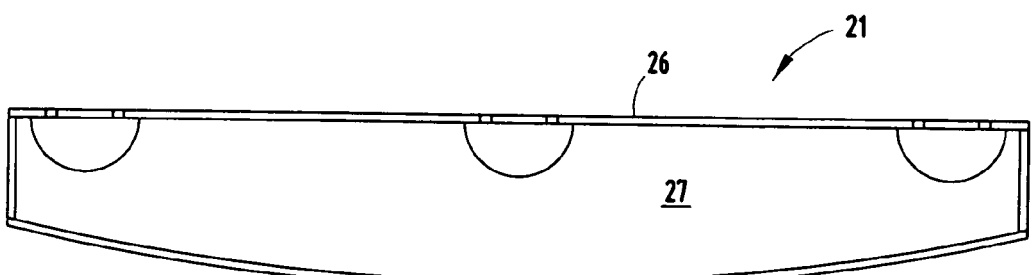
FIGS. 2–4 are top, front, and end views of the prior art standardized barrier shown above.
Figure 3:
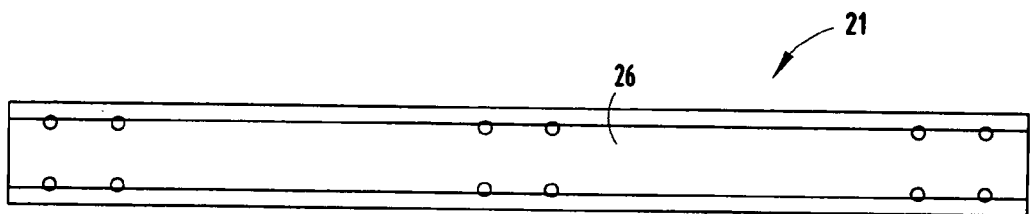
Figure 4:
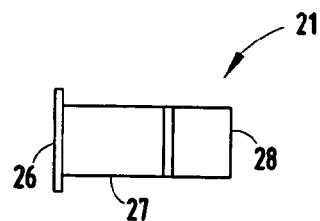

A bumper barrier tester 20 (FIG. 1) includes a standardized barrier 21 (FIG. 2) (also called "barrier impact tester" herein) adapted for testing vehicle bumper impact strength, and first and second barrier face components 22 and 23 (FIG. 1) attached to the barrier 21 to replicate a profile and function of a "generic" vehicle bumper. The first face component 22 (also called "energy absorber" herein) is a thermoformed energy-absorbing component that replicates an energy absorber of a passenger vehicle bumper system. Typically, the desired crush strength in vehicle bumper impact-testing is between about 50 psi to 75 psi, and the energy-absorbing component 22 is made of a material, thickness, and shape to achieve this desired impact strength. The second component 23 is a thermoformed fascia-simulating cover component that covers the energy-absorber-simulating component 22 and the barrier 21 in a manner replicating a vehicle fascia. It is contemplated that the second thermoformed cover component 23 can be a relatively simple C-shaped component on the barrier. Optionally, the cover component 23 is made to allow visual access to the energy absorber (i.e., visual access to the first energy-absorbing component 22, which allows inspection after a test). It is contemplated that the term "barrier" will be broadly construed as used herein to mean any test apparatus, stationary (e.g., a wall-type barrier) or movable (e.g., a pendulum-type barrier).

The present invention addresses the need for improved testing by utilizing thermoformed components made from sheets of thermoplastic material, preferably high density polyethylene (HDPE). Thermoforming is a process whereby a polymeric sheet is heated and drawn down onto a mandrel, and then cooled to retain its new shape. Advantageously, thermoformed components can be formed from tools that are low-cost and that can be quickly made with short lead times. Thus, the components 22 and 23 can be made quickly and at a low cost, despite their low volume and wide variety of different shapes. It is also possible to vary crush load without change in tooling. For higher crush loads, thicker sheets are used. For lower crush loads, thinner sheets are used. The tested components 22 and 23 can also be easily recycled and made into new parts.

The illustrated energy-absorber-simulating thermoformed component 22 (FIG. 1) includes a base wall 30 that abuts the curved front plate 28 of the barrier 21. It is contemplated that the crush boxes can all be the same or similar size, shape, and height, depending upon the particular requirements for the component 22 (and also contemplated that they can be varied as desired). In particular, see component 22A (FIG. 6) described below. In component 22, the illustrated crush boxes 31A–31D each include a front wall, and top, bottom, and side walls forming a hollow three-dimensional shape. The crush boxes 31A–31D are arranged to provide the three-dimensional curvilinear front shape (also called "sweep" or "longitudinal curvature" herein) as desired of the bumper system, and to provide the regional strength and force-deflection absorption curve that they are intended to replicate. The illustrated component 22 is limited to a height equal to the vertical dimension of the beam 21, and further is limited in length to a width equal to the width dimension of the beam 21. However, it is contemplated that the energy-absorber-simulating thermoformed component 22 can be larger or smaller in vertical and longitudinal directions than the barrier 21, depending upon the particular "generic" bumper system that is being replicated. The component 22 can include flanges for attachment to the barrier 21, or can be held against a face of the barrier 21 by the second component 23, as discussed below. Alternatively, the energy-absorbing component 22 and cover component 23 can be held to the barrier impact tester by one-piece push-pins fasteners (sometimes called "Christmas tree fasteners") or by two-piece push-pin fasteners 38' (FIG. 1) (which have a body and a rivet-like push pin core for spreading legs of the fastener once inserted into a hole). Notably, the fasteners can extend vertically into a top or bottom of the components 22 and/or 23 (FIG. 1), or can extend through a front wall of the components 22, such as at location 38A (FIG. 7A). Such fasteners are known in the art and are available commercially. The fasteners are extended through holes or slots (or slits) in the components 22 and/or 23 and are extended into holes in a face or other surface of the barrier impact tester. The fasteners are easily applied and easily removed, yet provide secure retention.

The fascia-simulating thermoformed component 23 (FIG. 1) is shaped to cover the energy-absorber-simulating thermoformed component 22 and to hold it against a face of the barrier 21. Specifically, the fascia-simulating thermoformed component 23 has a front wall 35 that is formed to replicate a front profile of the "generic" bumper system that is being used on the barrier, and further has top and bottom walls 36 and 37 that extend rearwardly for connection to top and bottom attachment locations 38 and 39 on the barrier 21. It is contemplated that the attachment locations 38 and 39 can be slots to permit slip (and prevent shearing of fasteners or the absorber material) during impact testing, . . . or the locations 38 and 39 can be holes for a more secure and fixed retention. The illustrated component 23 has a relatively rectangular cross section and a slightly curved longitudinal shape, but it is noted that its shape can be any shape that replicates a profile of a bumper system, including bumper systems having a more pointed center "nose" or a more rounded center "nose" (vertically or horizontally).

Preferably, the front surface of the energy-absorber-simulating thermoformed component 22 is similar to the rear surface of the fascia-simulating thermoformed component 23, so that the two components matingly engage to provide energy-absorbing characteristics that are similar to the "generic" bumper system being replicated, including vertical slippage of the fascia-simulating thermoformed component 23 on the energy-absorber-simulating thermoformed component 22 during impact. The energy absorber 22 and component 23 can be easily and quickly attached to the barrier 21 in different ways to facilitate their use. For example, pin-type fasteners (one-piece or two-piece) can be inserted through holes in the energy-absorbing component 22 and/or the cover component 23 and into holes in the barrier impact tester. Also, it is contemplated that the mating engagement of the cover component 23 onto the energy absorbing component 22 can include surfaces providing friction-fit to provide retention. Where corner impact-testing is done, the energy absorber 22 (and potentially component 23) can be inverted end-to-end after the first test, and then reused for a second corner impact test. Notably, the present system does not require that brackets and mounts be added to the barrier 21 in order to use the components 22 and 23, such that the present impact barrier 21 can continue to be used in all existing test procedures.

Figure 5:
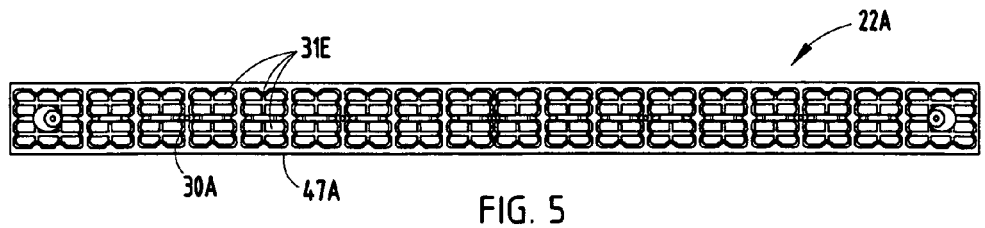
FIGS. 5–6 are front and perspective views of a flexible energy absorber component that is adapted to flex and be attached to barrier impact testers having different sweep radii.
Figure 6:
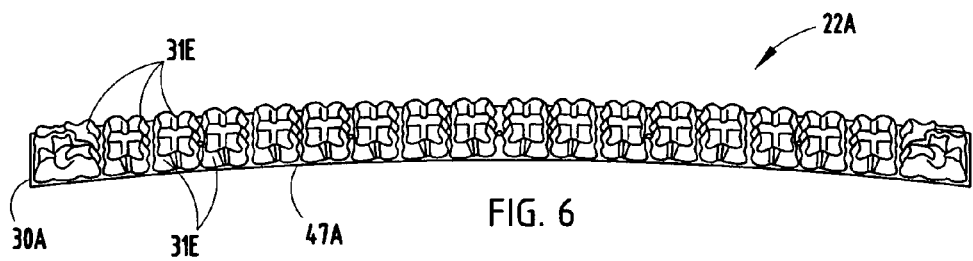

FIGS. 5–6 are top and perspective views of another flexible energy-absorber-simulating component 22A (also called an "energy absorber" herein). This energy absorber 22A is similar to component 22 and like component 22, is adapted to flex and be attached to barrier impact testers having different sweep radii. (See FIG. 1B.) Though the energy-absorbing component 22A can be flexed longitudinally, it is noted that it includes short edge flanges 47A along top and bottom edges. The flanges 47A help stabilize the energy-absorbing component 22A on a face of the barrier tester 21A. The flanges 47A can be notched if necessary to reduce buckling stresses upon longitudinal bending or "changing the sweep radii" of the component 22A. The term "sweep radii" refers to the longitudinal curvature or aerodynamic shape of a bumper, as best seen in a top view (FIG. 6).

Figure 7:
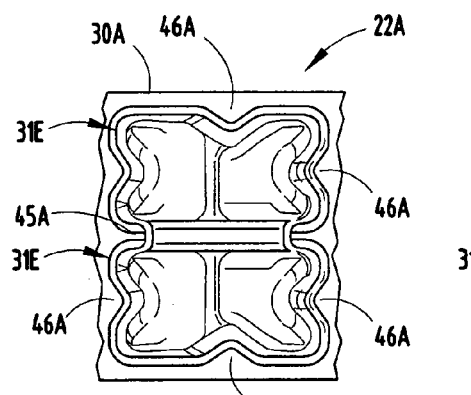
FIGS. 7–9 are top, bottom, and side elevational views of a crush box from the energy absorber component of FIG. 5.
Figure 7A:
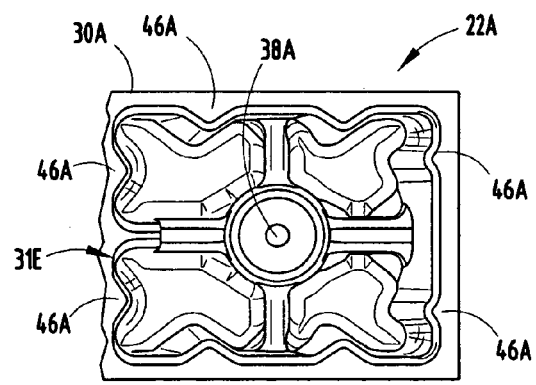
FIG. 7A is a top view of an end-located crush box.
Figure 8:
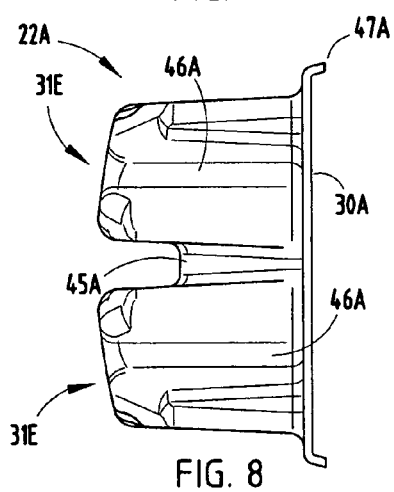
Figure 9:
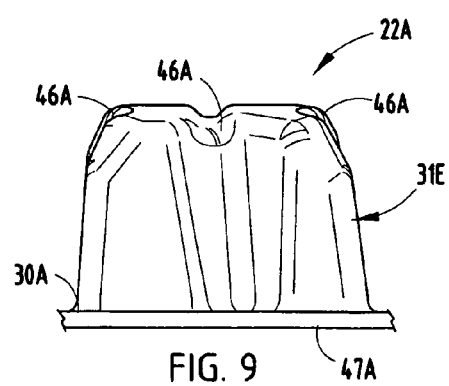
Figure 10:
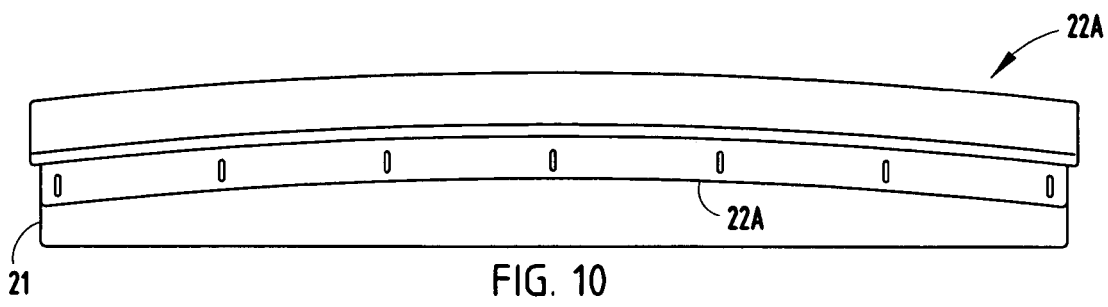
FIGS. 10–11 are top views of the energy absorber component shown in FIG. 5 and positioned on a front face of a barrier impact tester, FIG. 11 having the fascia-simulating cover component removed to better show the energy absorber component, and also FIG. 11 showing that the energy absorber component can have different front shapes (compare the dashed lines and the phantom lines)

FIGS. 7–9 are top, bottom, and side elevational views of a crush box from the energy absorber of FIG. 5, and show the box-shaped nature of the crush boxes 31E, and their resultant energy-absorbing capability. Each crush box 31E is adapted to provide the desired level of impact resistance and more specifically to provide a desired force-deflection curve. For example, one type of often-desired impact absorption profile is embodied in a force-deflection curve that rises quickly during an initial part of the impact stroke to a near high energy-absorbing level (without spikes), and then maintains that level of energy absorption over the stroke of the impact sequence. Another desired force-deflection curve may have a lower initial energy absorption for improved pedestrian safety (i.e., reduced pedestrian injury due to lower initial resistance to crush). A typical force/deflection curve of a single crush box 31E (also called a "pod") is about 50 psi to 75 psi. In the illustrated energy-absorbing component 21, two horizontal rows of crush boxes 31E are provided. The walls of the crush boxes 31E can have any draft angle desired to facilitate the thermoforming process, but preferably they are kept relatively in-line with the expected direction of impact. The top and bottom crush boxes 31E (and/or adjacent crush boxes) can be integrally connected at structure 45A, as shown in FIG. 8. Undulations 46A are formed in the walls of the crush boxes 31E. The undulations form linear channels and ridges that extend parallel a direction of expected impact, and form undulating curves in a direction perpendicular to the direction of expected impact, such that they stiffen and stabilize the walls in the direction of expected impact.

Figure 11:
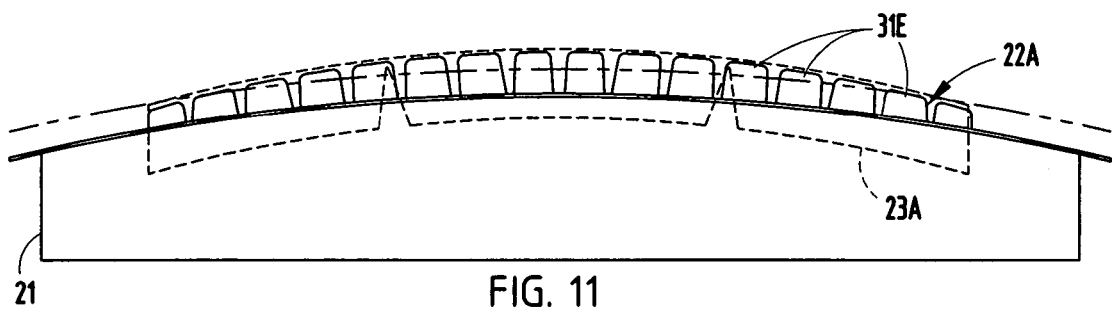

FIG. 11 is a top view of the energy absorber 22A shown in FIG. 5 with it positioned on a front face of a barrier impact tester 21. The illustrated crush boxes 31A have different heights, causing a front of the energy absorber 22A to define a greater sweep (i.e., a small sweep radius) than a front of the bumper impact tester to which it is attached. (The phantom lines in FIG. 11 represent a front surface of the test arrangement if an energy absorber with uniform crush box heights was used.) The dashed lines represent a holder for the energy absorber for retaining it to the bumper impact tester. The illustrated fascia-simulating component 23A (FIG. 1) includes slots 38 for receiving attachment pins for attachment to the barrier tester 21, and it is contemplated that it could also include notches in its top and bottom walls to provide a degree of longitudinal flexibility.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An energy absorber adapted for attachment to a face of a bumper impact tester, comprising:
   an energy-absorbing component thermally formed from a sheet of polymeric material, the component having a base wall shaped to engage the face of the bumper impact tester, a plurality of separated front walls shaped to replicate a profile of a vehicle bumper, and thermoformed fore-aft walls supporting the front walls on the base wall, the fore-aft walls forming with the front walls energy-absorbing crush boxes that extend forward of the base wall, the energy-absorbing crush boxes being sufficiently spaced apart and the base wall being sufficiently flat and flexible such that the energy-absorbing component can be flexed longitudinally and the front walls moved relative to each other, allowing the energy-absorbing component to bend to match different curvilinear shapes of a front surface on different bumper impact testers.

2. An energy absorber adapted for attachment to a face of a bumper impact tester, comprising:

an energy-absorbing component thermally formed from a sheet of polymeric material, the component having a base wall shaped to engage the face of the bumper impact tester, front walls shaped to replicate a profile of a vehicle bumper, and thermoformed fore-aft walls supporting the front walls on the base wall, the fore-aft walls forming with the front walls energy-absorbing crush boxes that extend forward of the base wall; and a holder with a recess configured to engage and retain the component to the bumper impact tester, the holder having attachment slots therein along top and bottom edges of the holder for engaging top and bottom surfaces on the face of the bumper impact tester.

3. The energy absorber defined in claim 2, including quick release fasteners engaging the attachment slots.

4. The energy absorber defined in claim 3, wherein the fasteners are push pin fasteners.

5. The energy absorber defined in claim 2, wherein the holder has a C-shaped cross section defining a rearwardly-facing cavity shaped to receive the energy absorber, the C-shaped cross section including the top and bottom edges both of which extend horizontally rearwardly.

6. The energy absorber defined in claim 1, including a holder for holding the energy absorber on the front surface of the impact testers, the holder having a C-shaped cross section defining a rearwardly-facing cavity for receiving the energy absorber, the C-shaped cross section including the top and bottom edges both of which extend horizontally rearwardly for engaging top and bottom surfaces on the impact testers.

* * * * *

UNITED STATES PATENT AND TRADEMARK OFFICE
CERTIFICATE OF CORRECTION

PATENT NO.        : 7,228,723 B2
APPLICATION NO.   : 11/051904
DATED             : June 12, 2007
INVENTOR(S)       : Darin Evans et al.

Page 1 of 1

It is certified that error appears in the above-identified patent and that said Letters Patent is hereby corrected as shown below:

Title:
  "BUMPER IMPACT-TESTING DEVICE" should be --ENERGY ABSORBER FOR BUMPER IMPACT TESTER--.

Signed and Sealed this

Twenty-fifth Day of December, 2007

JON W. DUDAS
*Director of the United States Patent and Trademark Office*